(12) United States Patent
Combes et al.

(10) Patent No.: US 8,322,503 B2
(45) Date of Patent: Dec. 4, 2012

(54) DOUBLE-CLUTCH TRANSMISSION ELEMENT FOR A HYBRID PULL CHAIN OF A MOTOR VEHICLE, METHOD OF MOUNTING SAME, AND MOTOR VEHICLE EQUIPPED WITH ONE SUCH ELEMENT

(75) Inventors: Emmanuel Combes, Saint-Cyr-sous-Dourdan (FR); Herve Focqueur, Franconville (FR); Johannes Heinrich, Friedrichsdorf (DE); Hans Jurgen Hauck, Schwaebisch Hall (DE)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 887 days.

(21) Appl. No.: 11/570,026

(22) PCT Filed: May 31, 2005

(86) PCT No.: PCT/FR2005/050393
§ 371 (c)(1),
(2), (4) Date: Feb. 6, 2007

(87) PCT Pub. No.: WO2005/118321
PCT Pub. Date: Dec. 15, 2005

(65) Prior Publication Data
US 2007/0213163 A1 Sep. 13, 2007

(30) Foreign Application Priority Data
Jun. 3, 2004 (FR) ...................... 04 06026

(51) Int. Cl.
*B60K 6/387* (2007.10)
*B60K 6/48* (2007.10)
*B60K 6/405* (2007.10)
*F16D 25/10* (2006.01)

(52) U.S. Cl. .............. 192/48.8; 192/48.611; 180/65.25; 29/469

(58) Field of Classification Search ............... 192/48.8, 192/87.1, 87.11, 87.15, 48.611, 48.619, 85.09, 192/85.37; 477/5; 180/65.1, 65.21, 65.25; 903/914, 946; 29/469; 310/78, 92, 100; F16H 47/08
See application file for complete search history.

(56) References Cited

U.S. PATENT DOCUMENTS
276,688 A * 5/1883 Hartley .................. 192/69.8
(Continued)

FOREIGN PATENT DOCUMENTS
EP 1541401 A 6/2005
(Continued)

OTHER PUBLICATIONS
International Search Report mailed Sep. 29, 2005 in PCT/FR2005/050393.

*Primary Examiner* — David D Le
*Assistant Examiner* — Terry Chau
(74) *Attorney, Agent, or Firm* — Nicolas E. Seckel

(57) ABSTRACT

The inventive double-clutch transmission element for a hybrid pull chain of a motor vehicle comprises a motion input shaft (37), a motion output shaft (39), an electrical machine (31) comprising a stator (61) and a rotor (63), a first clutch (33) providing a connection between the input shaft (37) and an intermediate member (73), and a second clutch (35) providing a connection between the intermediate member (73) and the output shaft (39), the intermediate member (73) being coupled in rotation to the rotor (63). A casing comprising a first half-shell (51) rotatably supporting the input shaft (37) and a second half-shell (52) rotatably supporting the output shaft (39) defines a housing in which the two clutches (33, 35) and the electrical machine (31) are mounted in a co-axial manner. The invention also relates to a motor vehicle equipped with such transmission element and to a method of mounting same.

20 Claims, 7 Drawing Sheets

U.S. PATENT DOCUMENTS

| | | | | |
|---|---|---|---|---|
| 1,138,098 | A * | 5/1915 | Fornaca | 74/370 |
| 3,744,606 | A * | 7/1973 | Bucksch | 192/87.11 |
| 4,346,773 | A * | 8/1982 | Hofbauer et al. | 180/165 |
| 5,258,651 | A * | 11/1993 | Sherman | 290/23 |
| 5,482,512 | A * | 1/1996 | Stevenson | 475/5 |
| 5,773,904 | A * | 6/1998 | Schiebold et al. | 310/92 |
| 5,789,823 | A * | 8/1998 | Sherman | 290/47 |
| 6,354,974 | B1 * | 3/2002 | Kozarekar | 475/5 |
| 6,638,193 | B2 * | 10/2003 | Hamai | 475/5 |
| 6,655,484 | B2 * | 12/2003 | Levin | 180/65.25 |
| 6,668,953 | B1 * | 12/2003 | Reik et al. | 180/53.8 |
| 7,293,637 | B2 * | 11/2007 | Janson et al. | 192/87.11 |
| 7,325,291 | B2 * | 2/2008 | Ahnert | 29/469 |
| 7,832,537 | B2 * | 11/2010 | Blessing et al. | 192/48.91 |
| 2006/0163019 | A1 * | 7/2006 | Feldhaus et al. | 192/48.8 |
| 2009/0000896 | A1 * | 1/2009 | Knowles | 192/48.1 |

FOREIGN PATENT DOCUMENTS

| | | |
|---|---|---|
| FR | 2796600 A | 1/2001 |
| FR | 2814517 A | 3/2002 |
| JP | 06144020 A * | 5/1994 |
| WO | WO 9922955 A | 5/1999 |
| WO | WO 03016734 A1 * | 2/2003 |

* cited by examiner

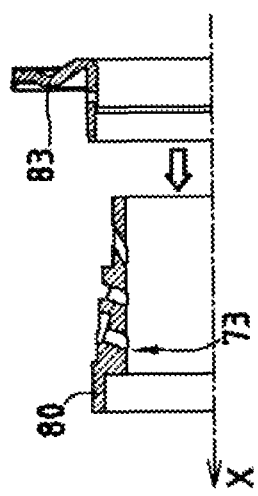
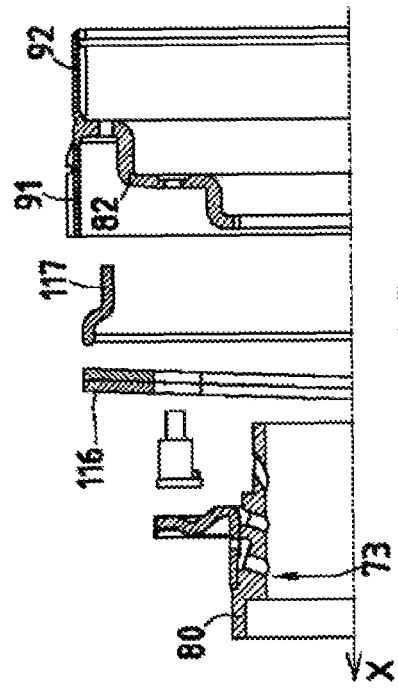
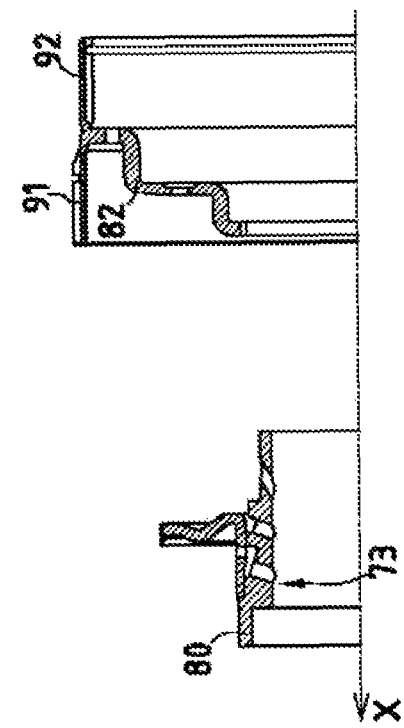

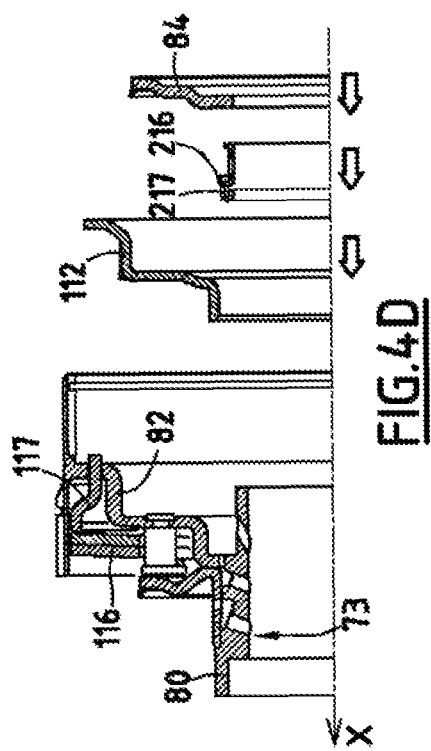
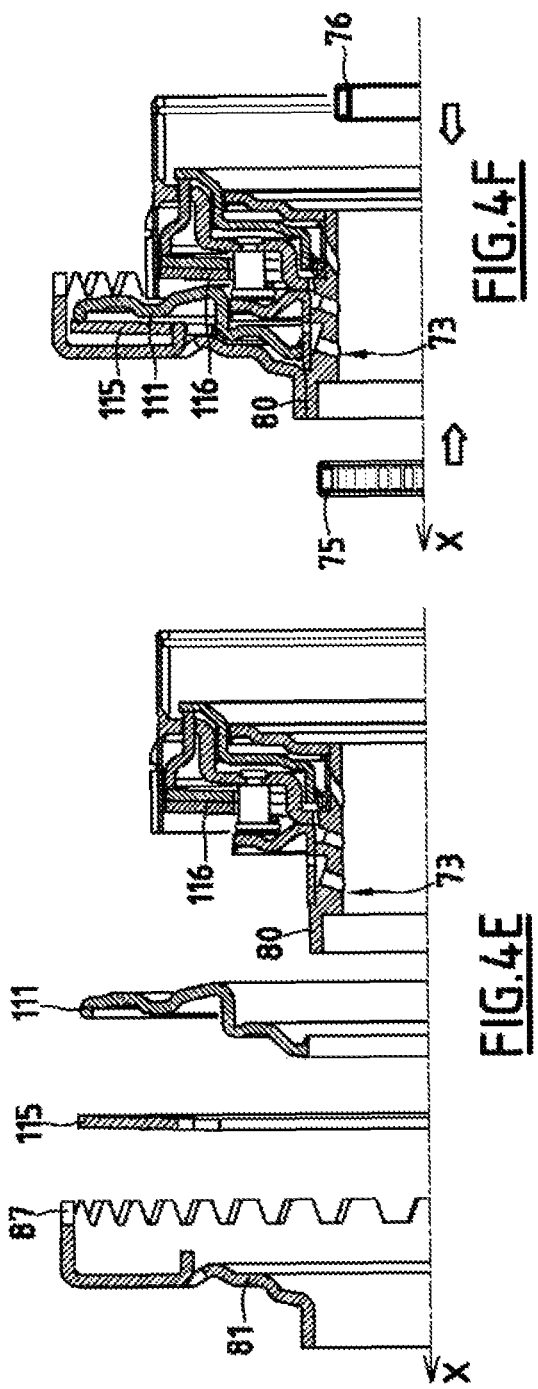

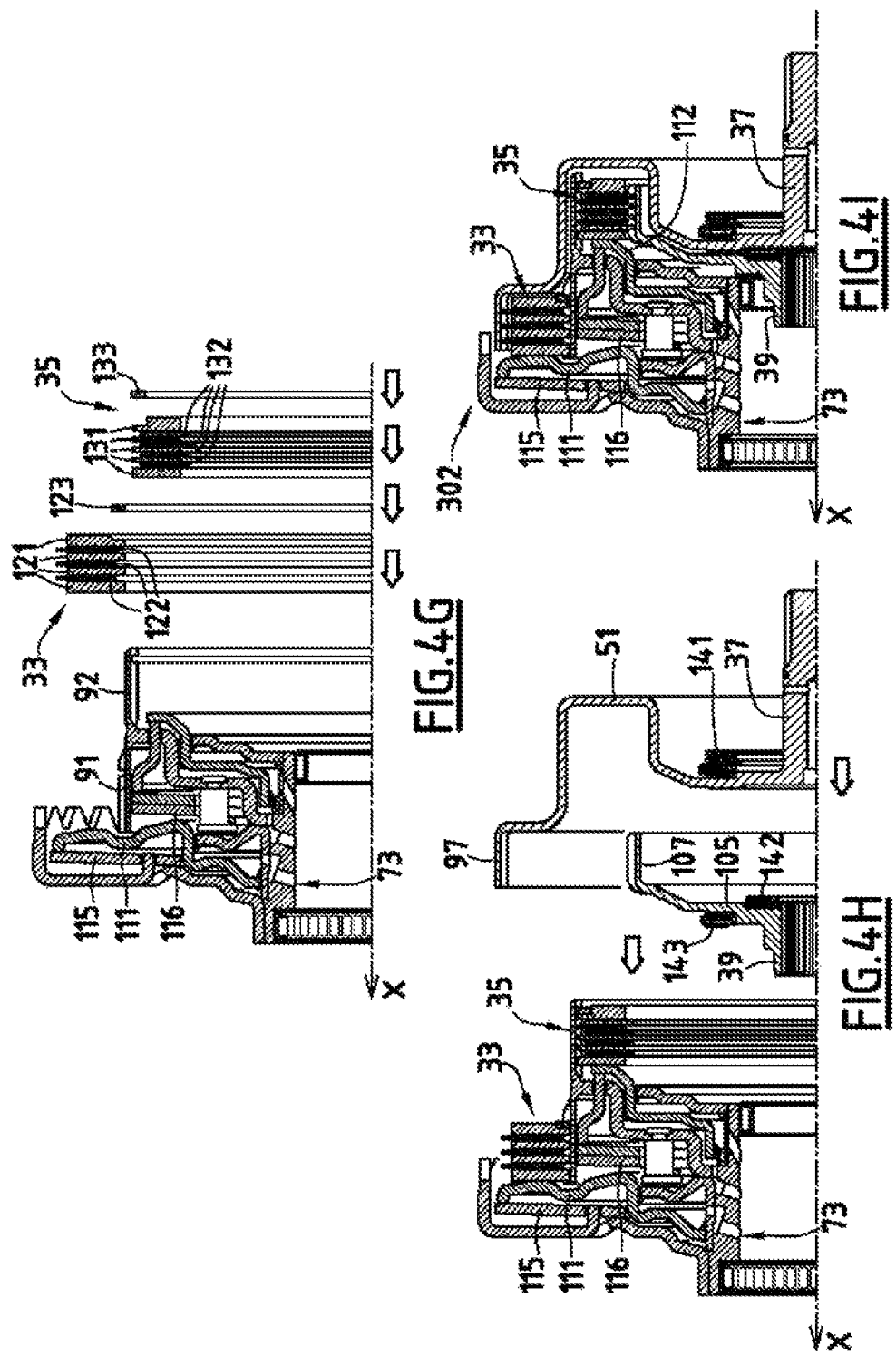

DOUBLE-CLUTCH TRANSMISSION ELEMENT FOR A HYBRID PULL CHAIN OF A MOTOR VEHICLE, METHOD OF MOUNTING SAME, AND MOTOR VEHICLE EQUIPPED WITH ONE SUCH ELEMENT

The invention concerns a transmission element for a traction chain of the parallel hybrid type.

By parallel hybrid traction chain, it is meant a traction chain providing to a wheel shaft a mechanical energy from at least one engine of the "irreversible" type (in general, a thermal engine) and at least one engine of the "reversible" type (in general, an electrical machine, which will be designated also in the following by the term "electric motor," it being understood that this "motor" can operate according to a motor mode and a generator mode), and in which the energy node coming from these two engines has a mechanical nature.

FIG. 1 is a schematic view of a parallel hybrid traction chain of a known type (for example, from the French patent application published under No. 2 814 121) to which the invention applies more particularly.

Such a traction chain 1 comprises thus essentially a thermal engine (or, more generally, an irreversible engine) 3, a transmission element 5, and a gear box 7, whose input is connected to the transmission element 5 and whose output is connected to a wheel shaft 9.

The transmission element 5 comprises an electrical machine (or, more generally, a reversible motor) 11 of the hybrid traction chain, as well as a first connecting clutch 13 between the thermal engine 3 and the electrical machine 11, and a second connecting clutch 15 between the electrical machine 11 and the gear box 7.

The invention concerns more particularly a transmission element for a traction chain of the parallel hybrid type, said element comprising a movement input shaft intended to be connected to a thermal engine, a movement output shaft intended to be connected to a gear box, an electric motor comprising a stator and a rotor, a first connecting clutch between the input shaft and an intermediate member, and a second connecting clutch between the intermediate member and the output shaft, the intermediate member being linked in rotation to the rotor.

In known hybrid traction chains, of the type described above, the transmission element integrating the electric motor and the two connecting clutches to the thermal engine and to the gear box, respectively, is not intended to be easily interchangeable with a simple clutch as is used in standard traction chains having a single source of energy.

The problem that the invention proposes to resolve consists in designing a transmission element such as described above, which is capable of being adapted to a standard mono-source traction chain, and to be used as a substitute for a simple clutch, to form a traction chain of the parallel hybrid type, without major modifications of the other elements of the traction chain.

To this effect, the transmission element according to the invention comprises a casing comprising a first half-shell supporting the input shaft movable in rotation, and a second half-shell supporting the output shaft movable in rotation, these two half-shells defining a housing in which are mounted, in a coaxial manner, the two clutches and the electric motor.

The interest of the invention is explained essentially by the small number of hybrid drive vehicles that are produced at present, as compared to the number of standard, in general, thermal, drive vehicles of the same model. Thus, for a given model of vehicle, a motor vehicle manufacturer produces daily a large number of gear boxes, of simple "clutch-packs" (or clutch boxes), and of thermal engines of a same type, whereas it produces a small number of transmission elements, with electric motor and double clutch, for hybrid chain.

The principal advantage brought about by the invention consists in providing a transmission element with electric motor and double clutch, which is in the shape of an autonomous "box" or "module," which is capable of being mounted instead of the simple "clutch-pack," without major modification of the gear box or of the thermal engine. The vehicle manufacturer can, thanks to the invention, go in an extremely supple manner from the production of thermal drive vehicles to the production of hybrid drive vehicles, and conversely, while changing only one of the traction chain components. Optionally, the productions can be performed in the same assembly line.

According to other characteristics of the invention, taken alone or according to all combination that can be envisioned technically:

- the two clutches are arranged radially inside the electrical machine;
- the first half-shell is integral with the stator and supports the rotor movable in rotation;
- the two clutches, the input and output shafts, and the intermediate member are part of a module that is arranged as one unit in the housing;
- the intermediate member and the rotor are engaged mutually through complementary axial teeth;
- the two clutches are of the wet type, the housing being closed so as to be sealed with respect to a lubrication and/or cooling fluid;
- the two clutches are returned toward the engaged position;
- the two clutches are disposed in a tiered manner, one being disposed radially on the outside with respect to the other;
- the first clutch is disposed radially on the outside with respect to the second clutch;
- the stator is disposed radially on the outside of the rotor, and the second clutch is disposed radially inside the rotor;
- at least one of the clutches, preferably, both, is actuated by means of a control fluid via a single respective pressure member; and
- the transmission element has an axial fluid supply tube, in particular for hydraulic supply, integral with one of the half-shells and protruding toward the inside of the housing.

Another object of the invention is a motor vehicle comprising a traction chain of the parallel hybrid type, said traction chain comprising a thermal engine, a gear box, and a transmission element such as described above, connecting the thermal engine to the gear box.

Another object of the invention is a method of assembling a transmission element as described above.

According to a first embodiment, the method comprises the following successive steps:

mounting a subassembly comprising in an integral manner the first clutch, the second clutch, and the intermediate member, on a subassembly comprising the second half-shell;

mounting a subassembly comprising in an integral manner the first half-shell and the electrical machine, on the assembly thus formed.

According to a second embodiment, the method comprises the following successive steps:

mounting a subassembly comprising in an integral manner the first clutch, the second clutch, and the intermediate member, on a subassembly comprising in an integral manner the first half-shell and the electrical machine; and mounting the assembly thus formed on a subassembly comprising the second half-shell.

Preferably, the supply tube is mounted preliminarily on the second half-shell, so as to assemble the subassembly comprising the second half-shell.

Particular embodiments of the invention will now be described in more detail in reference to FIGS. 2, 3, 4A to 4J of the annexed drawings, in which:

FIGS. 4A to 4J are analogous views, at a smaller scale, illustrating the successive steps of a particular mode of assembly of the transmission element.

Figure 1:
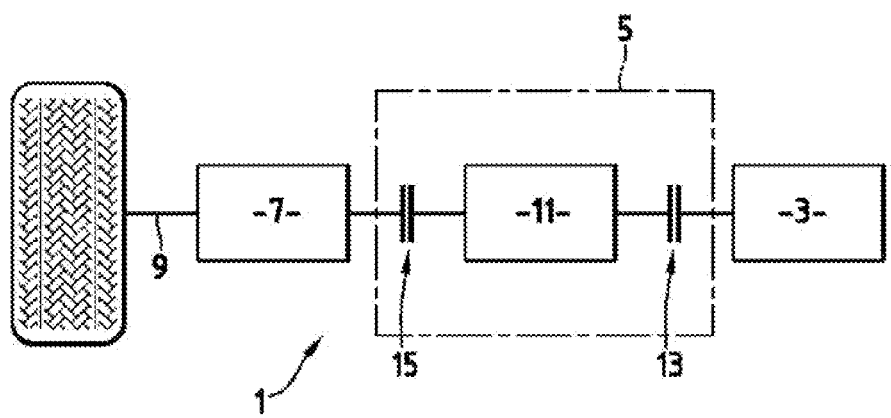
FIG. 1 is a schematic view of a parallel hybrid traction chain of a known type to which the invention applies more particularly.
Figure 2:
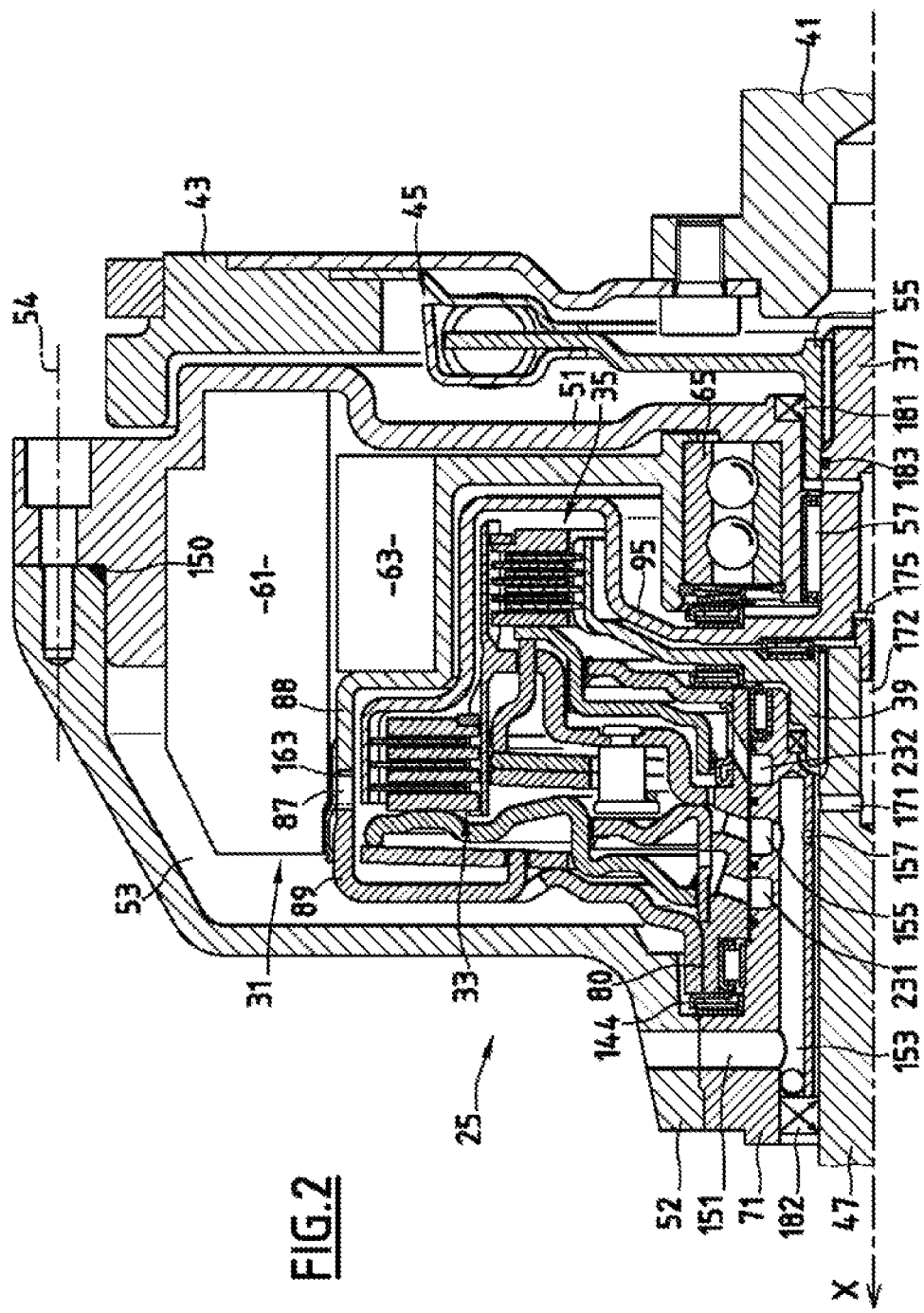
FIG. 2 is a partial view in axial partial cross-section of a transmission element according to the invention.
Figure 3:
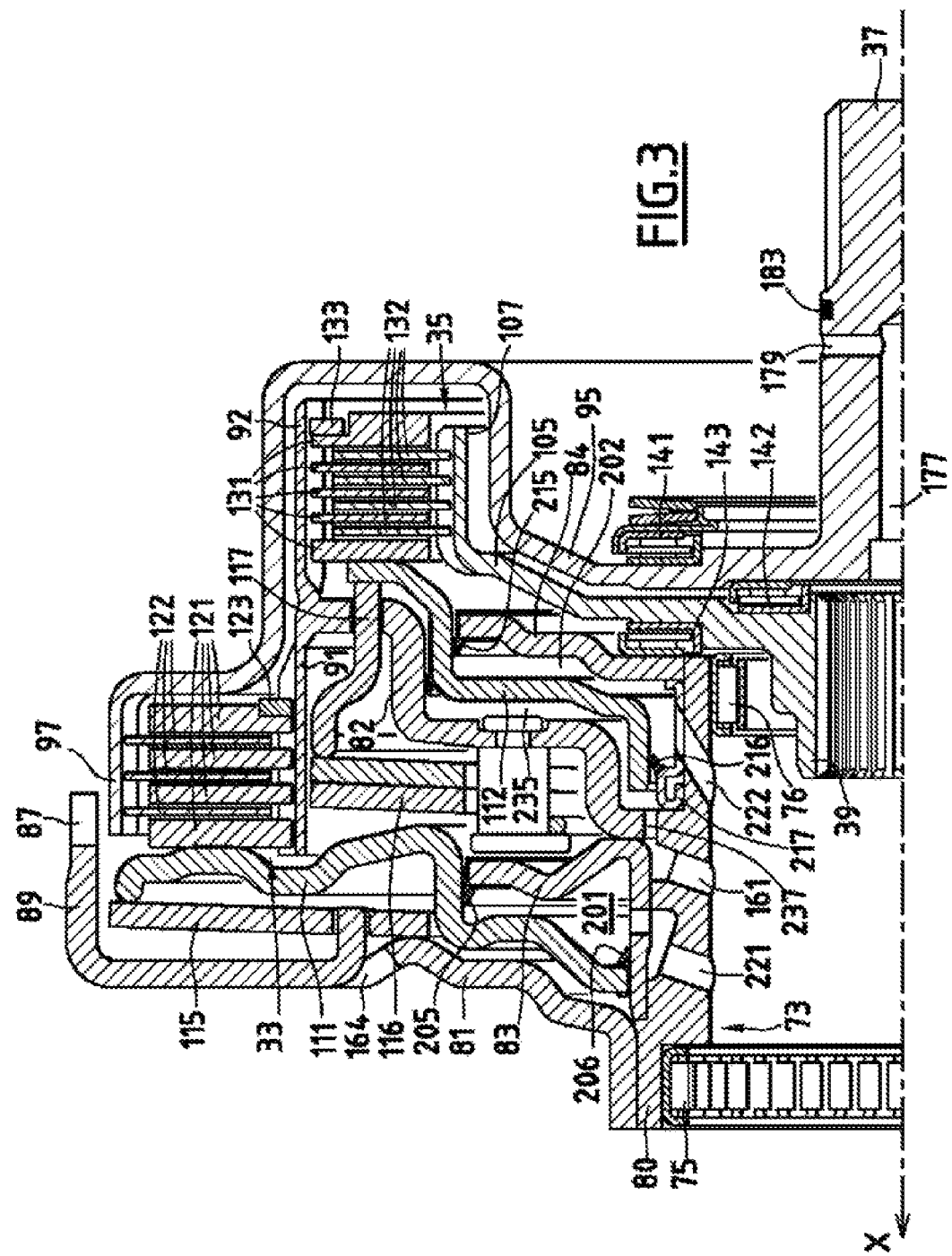
FIG. 3 is a view of a detail of FIG. 2, at a larger scale, which shows the second module of the transmission element, comprising essentially the clutches, the input and output shafts, the intermediate member, and the pistons.
Figure 4J:
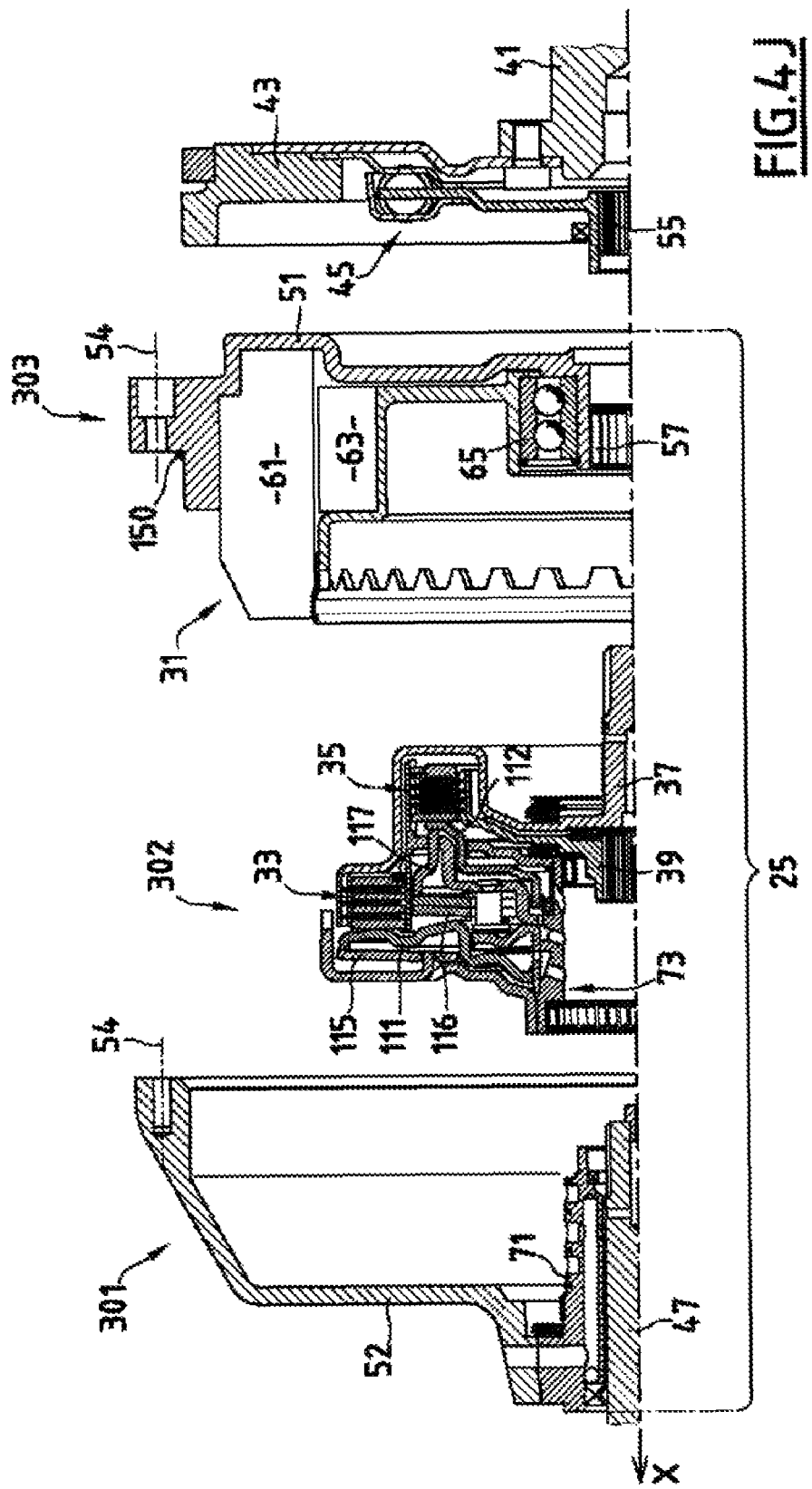

FIGS. 2 and 3 show a transmission element 25 conform to the invention, intended to connect, like the element 5 on FIG. 1, a thermal engine to a gear box. Like the element 5, the element 25 of the invention comprises an electrical machine 31, which will also be called "electric motor," a first clutch 33, and a second clutch 35.

The transmission element 25 comprises further a movement input shaft 37 and a movement output shaft 39, which are coaxial along an axis X. The axis X is oriented from the input toward the output to facilitate the following description.

The terms "upstream" and "downstream" have a meaning in reference to this orientation.

The input shaft 37 is integral in rotation with the crankshaft of the thermal engine, of which a portion, or "nose," is shown on FIG. 2 under reference numeral 41.

In the example shown, the crankshaft 41 is equipped with a flywheel 43, and connected to the input shaft 37 via a damping device 45.

The output shaft 39 is linked in rotation to the primary gear box input shaft, of which a portion is shown on FIG. 2 under reference numeral 47.

The transmission element 25 comprises a casing constituted essentially by a first half-shell 51 and a second half-shell 52, assembled by fixation means distributed over the periphery of the casing and symbolized on the Figures by interrupted lines 54. The casing half-shells 51, 52 delimitate internally a housing 53, inside which are arranged the electric motor 31, the clutches 33, 35, and the input 37 and output 39 shafts, in a coaxial manner.

The casing half-shells 51, 52 delimitate internally a housing 53, inside which are arranged the electric motor 31, the clutches 33, 35, and the input 37 and output 39 shafts, in a coaxial manner.

The input shaft 37 and the output shaft 39 are mounted movable in a rotation with respect to the casing 51, 52.

The input shaft 37 is a fluted shaft complementary to a hollow shaft 55 of the damping device 45, and an end portion of the input shaft 37 protrudes axially from the first half-shell 51. The input shaft 37 is mounted movable in rotation on the first half-shell 51 via a rolling bearing 57.

The output shaft 39 is a hollow shaft with internal flutes, having a shape complementary to the end of the gear box input shaft 47. To be engaged with the output shaft 39, the end of the gear box input shaft 47 protrudes inside the housing 53.

The electric motor 31 comprises a stator 61, equipped with a collector, integral with the first casing half-shell 51, and a rotor 63 mounted movable in rotation on the first half-shell 51 via a bearing 65. The rotor 63 is arranged radially inside the stator 61.

The first 33 and second 35 clutches are of the wet type, and the transmission element 25 is equipped with an axial tube 71 for distribution of lubrication and cooling fluid as well as for control. This tube 71 protrudes inside the housing 53 of the second casing half-shell 52.

The transmission element 25 has an intermediate transmission member 73 mounted movable in rotation on the tube 71, radially outside, via two bearings 75, 76.

The intermediate member 73 is formed essentially with a hub 80, and four radial walls 81, 82, 83, 84, shifted axially with respect to each other, and made integral with the hub 80 by welding for walls 81, 82, 84, and by hooping for wall 83.

The intermediate member 73 is linked in rotation with the rotor 63 via complementary axial teeth 87 which are mutually engaged, and formed on a peripheral portion of the rotor 63 and on a peripheral portion of the first radial wall 81, respectively.

The second radial wall 82 is formed with an integral peripheral ring constituted by a first half-ring 91 extending in the downstream axial direction, and a second half-ring 92 extending in the upstream axial direction.

Correspondingly, the input shaft 37 is formed, preferably in one piece, with a radial wall 95 which extends inside the housing 53, and which has at its periphery an axial ring 97. The axial ring 97 extends in a coaxial and radially external manner, with respect to the downstream half-ring 91. The first clutch 33 is arranged between said half-ring 91 and said ring 97.

In the same manner, the output shaft 39 is formed, preferably in one piece, with a radial wall 105 which extends inside the housing 53, and which has at its periphery an axial ring 107. The axial ring 107 extends in a coaxial and radially internal manner, with respect to the upstream half-ring 92 of the intermediate member 73. The second clutch 35 is arranged between said half-ring 92 and said axial ring 107.

The transmission element 25 comprises further a first actuating piston 111 and a second actuating piston 112 of the first clutch 33 and of the second clutch 35, respectively, as well as a first spring member 115 and a second spring member 116 acting on the first piston 111 and on the second piston 112, respectively, toward pressing on the respective clutch 33, 35.

Between the piston 112 and the spring member 116 is interposed, supported axially, a spacer having essentially axial fingers 117 distributed on the periphery of a ring. These fingers 117 pass through the wall 82.

The first clutch 33 is essentially constituted by a first series of discs 121 linked in rotation to the first half-ring 91 by flutes, and movable axially on the latter, along these flutes, under the action of piston 111; and of a second series of discs 122 linked in rotation to the axial ring 97 by flutes, and movable axially on the latter, along these flutes also under the effect of piston 111. The first discs 121 and the second discs 122 are interleaved with each other in an alternating manner.

The discs 121, 122 are stopped axially by a stop 123 opposed to the piston 111.

It is observed that the discs 121, 122 can pass from an unclutched position, in which the first discs 121 are not in contact with the second discs 122, and an engaged position of the first discs 121 and second discs 122, in which the first discs 121 and second discs 122 are pressed against each other.

In the unclutched position of the clutch 33, the input shaft 37 and the intermediate member 73 are free in rotation with respect to each other.

The first spring member 115, constituted in the example shown by a spring-washer, for example, of the Belleville washer type, is fixed to the first radial wall 81, and acts on the piston 111 in the engaged position.

The second clutch 35 has a constitution and operation analogous to the first: it comprises a first series of discs 131 associated to the second half-ring 92, and a second series of interleaved discs 132, associated to the axial ring 107. The axial movement of the discs 131, 132 is limited by a stop 133.

In the example shown, the spring member 116 is a double spring washer, of the Belleville type, fixed to the second wall 82. The spring member 116 acts on the piston 112 toward the engaged position of the second clutch 35, via fingers 117.

As is visible on FIG. 2, the two clutches 33, 35 are shifted axially and radially according to a tiered or "stepped" arrangement, i.e., the first clutch 33 is disposed radially outside with respect to the second clutch 35. The latter is arranged inside the rotor 63.

The transmission element 25 is further equipped with needle stops, among which a first one 141 is interposed axially between the bearing 65 and the radial wall 95 of the input shaft 37; a second one 142 is interposed axially between the radial wall 95 and the radial wall 105 of the output shaft 39; a third one 143 is interposed between the radial wall 105 and the radial wall 84 of the intermediate member 73; and a fourth one 144 is interposed between the hub 80 and a shoulder of the tube 71.

The fluid distribution tube 71 is adapted to distribute lubrication and cooling fluid inside the transmission element 25, i.e., inside the housing 53. The latter is sealed against this fluid, in particular in the area of the jointing of the two casing half-shells 51, 52, by means of a peripheral seal 150.

In the vicinity of the axis X, the sealing of the transmission element 25 against the lubrication and cooling fluid is obtained, on the one hand, by a first lip seal 181, which is supported on the first half-shell 51 and the outside surface of the hollow shaft 55, and by a second lip seal 182, which is supported on the inside surface of the tube 71 and on the outside surfaces of the primary gear box input shaft 47, and on the other hand, by an O-ring 183 placed between the input shaft 37 and the hollow shaft 55.

This tube 71 has, provided in its wall, a first fluid supply radial channel 151, a first distribution axial channel 153 connected to said supply channel 151, an orifice 155 provided between the distribution channel 153 and the outside of the tube 71, and an orifice 157 provided between the distribution channel 153 and the inside of the tube.

The hub 80 of the intermediate member 73 is equipped with a channel 161 opening onto the orifice 155, and setting in communication the distribution channel 153 and the housing 53.

In operation, the supply channel 151 is connected to a circuit for the supply of cooling and lubrication fluid. This fluid is diffused inside the housing 53 via the distribution channel 153, the orifice 155, and the channel 161, so as to lubricate and cool the first clutch 33, the second clutch 35, and the electric motor 31.

It will be noted that the lubrication and cooling fluid is diffused radially toward the stator 61, thanks in particular to the passage 163 provided in the area of the teeth 87. The dimensioning of this passage 163 makes it possible to control the fluid flow rate organized between the portion of the housing 53 internal to the rotor 63, and the external portion in which the stator 61 is arranged.

It will also be noted that the relative disposition of the clutches 33, 35, and of the electric motor 31 makes it possible, due to the centrifugation of the lubrication and cooling fluid, to keep the first clutch 33 in a bath of lubrication and cooling fluid, during operation of the transmission element 25, whereas the area of the second clutch 35 is the seat of a mist of this same fluid. The interest of this disposition is to adapt the amount of fluid, present in the area of each clutch, in particular the calorific energy generated by these clutches.

The bath of fluid, in general, oil, in which the clutch 33 is maintained, is leveled thanks to a passage 164 in the area of the radial wall 81.

The first clutch 33 being subjected to heating more importantly than the second clutch 35, it is indeed necessary to organize, in the vicinity of first clutch, a markedly higher flow rate of cooling fluid.

The more important heating of the clutch 33, as compared to the clutch 35, is due to slipping phases, which are more constraining for the first than for the second. Further, maintaining the clutch 35 in a mist of fluid, rather than in a bath, makes it possible to reduce the drag forces of this fluid on the primary gear box shaft.

Further, the cooling and lubrication fluid is distributed toward the rolling bearing 57 and the bearing 65 to cool and lubricate the latter, via, successively: the distribution channel 153; the orifice 157; a radial passage 171 formed in the primary gear box input shaft 47; an axial channel 172 provided in this shaft; a nozzle 175 making it possible to adjust the fluid flow rate; an axial channel 177 formed in the input shaft 37; and, finally, a radial passage 179 opening in the vicinity of the rolling bearing 57.

The fluid distributed along this path flows into the housing 53, through the rolling bearing 57, toward the bearing 65 and the rotor 63, then toward the stator 61. The stator 61 and the rotor 63 are thus cooled and lubricated, not only by fluid which has transited via the orifice 155 and the passages 163, 164, but also by fluid which has transited via the orifice 157 and the path detailed previously. This fluid also makes it possible to lubricate the stops 141, 142, 143.

The dispositions that make it possible to move the pressure pistons or plates 111, 112, and thus to move the clutches 33, 35 from a position to another among their engaged and unclutched positions, and all intermediary positions, will now be described.

The first piston 111 defines, with the third radial wall 83 and the outside surface of the hub 80, a first pressure chamber 201, while the second piston 112 defines, with the fourth radial wall 84 and the outside surface of the hub 80, a second pressure chamber 202.

The first pressure chamber 201 is substantially sealed with respect to a control fluid by means of a lip seal 205 fixed in the periphery of the radial wall 83, and applied on a surface of the piston 111, and of a lip seal 206 fixed on a radially internal edge of the piston 111, and applied on the outside surface of the hub 80.

In an analogous manner, the pressure chamber 202 is substantially sealed by a first seal 215 applied on the radial wall 84 and the piston 112, and by a second lip seal 216 applied on the piston 112 and the outside surface of a part 217 arranged on the hub 80.

Each pressure chamber 201, 202 opens into the central bore of the hub 80 via two channels 221, 222, respectively, for the passage of the control fluid supply, formed in the hub 80.

The fluid distribution tube 71 is itself equipped with two channels 231, 232, connected to a control fluid supply circuit via respective radial supply channels (not shown) analogous to the channel 151, and respective axial distribution channels (not shown) analogous to the channel 153. The channels 231, 232, communicate with the passages 221, 222, respectively.

In the example shown, the control fluid is the same as the lubrication/cooling fluid, the control and lubrication/cooling circuits being partially common.

It is observed that, from an initially closed position of the clutch 33, 35, the passage to the unclutched position is obtained by supplying the respective pressure chamber 201, 202 with pressurized control fluid. The corresponding piston 111, 112 is then moved axially in the downstream direction, according to the orientation of the axis X (toward the left on FIG. 2), while compressing the spring member 115, 116 and releasing the piles of discs 121, 122, 131, 132.

Under the action of the spring 115, 116, the piston 111, 112 goes back to its initial position when the pressure of the control fluid in the respective pressure chamber 201, 202 is brought back to its low initial value. The clutch 33, 35 goes back then to its so-called "naturally closed," i.e., engaged, position, in the absence of a supply of the pressure chamber 201, 202 with control fluid.

It is observed that the two clutches 33, 35 can be operated independently, and that the description above relative to the operation of the clutches 33, 35 applies to one or the other independently.

Further, the pressure of control fluid which can be delivered to the pressure chambers 201, 202 can vary over a range of values, such that the corresponding clutch 33, 35 can be brought in one among zero (unclutched), total (engaged), or partial (sliding) transmission states.

It must be observed that the second radial wall 82 and the piston 112 define between them a compensation chamber 235, located on the side opposite the second pressure chamber 202 with respect to the piston 112. This compensation chamber 235 is supplied with lubrication and cooling fluid via the channel 161 and an orifice 237 provided in the radial wall 82. Thus, at high engine speed, the additional forces generated on the piston 112 by the centrifugation of the control fluid contained in the second pressure chamber 202 are compensated, and the piston 112 operates so as to allow the passage, between the discs 131, 132, of the torque for which it has been dimensioned. It can also be noted that the dimensioning of the clutch 33, of the piston 111, and of the spring 115, makes it possible to avoid a compensation chamber for the control of this clutch 33.

In reference to FIGS. 4A to 4J, preferred modes of assembly of the transmission element described above will now be described.

FIGS. 4A to 4I illustrate the assembly of the module 302 of the transmission element 25, which comprises essentially the clutches 33, 35, the input shaft 37, the output shaft 39, the intermediate member 73, and the pistons 111, 112. This module 302 can be called "double clutch pack." This is the module shown on FIG. 3.

The main steps of assembling the double clutch pack, illustrated on FIGS. 4A to 4I, are performed successively, in the order of the Figures. In a first step (FIG. 4A), the radial wall 83 is mounted by fitting on the hub 80 of the intermediate member 73.

In a second step (FIG. 4B), the part forming the radial wall 82 and the clutch half-rings 91, 92 is presented axially facing the assembly 73, 83 obtained previously.

In a third step (FIG. 4C), the radial wall 82 and the spring part 116 are tied axially, by interposing between them the spacer having the axial fingers 117, this subassembly 82, 116, 117 being subsequently mounted on the intermediate member 73, the fingers 117 then passing through the radial wall 82.

In a fourth step (FIG. 4D), the second piston 112, the added part 217 supporting the seal 216, and the radial wall 84 are slipped successively on the hub 80, on the upstream side of the assembly obtained previously.

In a fifth step (FIG. 4E), the first piston 111, the spring part 115, and the radial wall 81 equipped with the peripheral dogs 87 are mounted on the hub 80, on the downstream side of the assembly obtained previously.

For example, on the one hand, the spring part 115 is pre-mounted on the wall 81, and on the other hand, the piston 111 is pre-mounted on the hub 80, then the whole is assembled.

In a sixth step (FIG. 4F), the bearings 75, 76 are fitted inside the hub 80, on the downstream side and on the upstream side, respectively.

In a seventh step (FIG. 4G), the following are mounted successively:
the first clutch 33, i.e., the pile of discs 121, 122, externally on the half-ring 91 by guiding the discs 121 axially on the flutes of the half-ring 91,
the stop 123 until its stop position on the half-ring 91,
the second clutch 35, constituted by the pile of discs 131, 132, internally on the half-ring 92 by guiding the discs 131 axially on the flutes of the half-ring 92, and
the stop 133 on the half-ring 92, until its stop position on the latter.

In an eight step (FIG. 4H), the following are mounted successively, on the upstream side:
the output shaft 39, equipped with the bearing stops 142, 143, by guiding the axial ring 107 in the internal flutes of the discs 132 of the second clutch 35, and
the input shaft 37, equipped with its bearing stop 141, by guiding the ring 97 axially in the external flutes of the discs 122 of the first clutch 33.

The double clutch pack thus assembled is then in the form of a module 302 shown on FIG. 4I.

After the previous steps, the transmission element 25 is in the form of three distinct preassembled modules:
the first module 301 comprises essentially the second casing half-shell 52 and the fluid distribution tube 71, also called hydraulic supply tube;
the second module 302, whose main assembly steps have been described above;
the third module 303, which can be called "electrical machine pack," comprises essentially the first casing half-shell 51, the electric motor 31 (stator 61 and rotor 63), the rotor being mounted movable in rotation on the half-shell 51 via the bearing 65.

The first module 301 is preliminarily mounted on the gear box (shown only by its primary shaft 47). Besides, it could be provided that the second half-shell is made in one piece with the gear box casing.

According to a first embodiment of the method of assembling the transmission element 25:
the second module 302 is mounted on the first module 301, the hollow output shaft 39 being then fitted by engagement of the flutes with the end of the primary gear box shaft 47, and the intermediate member 73 being then engaged on the distribution tube 71, then
the third module 303 is mounted on the assembly thus obtained, by slipping the half-shell 51 with its integral bearing 57 on the input shaft 37, and by engaging the coupling by dogs 87.

The fixation means 54 of the two casing half-shells 51, 52 are then activated, so as to provide a tightened assembly of these two half-shells.

According to a second embodiment of the method of assembly, in a first step, the second module 302 and the third module 303 are assembled, and the assembly thus obtained is mounted on the first module 301, in a manner analogous with what has been described above.

It must be noted that, in both embodiments, the interfaces between the modules 301 and 302, on the one hand, and between the modules 302 and 303, on the other hand, are constituted by flutes.

At this stage of the assembly, it is also important to note that the distribution tube 71 ensures, in addition to its base function consisting in distributing the control and lubrication/cooling fluid, a function of centering the double clutch pack in the casing 51, 52.

Irrespective of the order of assembly selected, corresponding to one or the other of the embodiments described above, there remains only the step of arranging the transmission element 25 thus constituted on the thermal engine. To this effect, the nose of the crankshaft 41 is engaged on the end of the shaft 37, via the hollow shaft 55 of the damping device 45.

The transmission element and the modes of assembly that have just been described above make it possible, in a motor vehicle assembly line, to pass from a hybrid transmission configuration to a standard transmission configuration, and conversely, without major modification of the other elements of the transmission chain, nor of the method of assembly.

This design makes it possible also to center the electrical machine and the double clutch pack independently on the first casing half-shell.

The structure of the transmission element conform to the invention makes it possible to replace advantageously a momentum element external to the clutch box by the rotor of the electrical machine contained in the transmission element.

Indeed, some engines require the implantation of a double damping flywheel, constituted by a primary momentum element and by a secondary momentum element.

By replacing the secondary momentum element of a double damping flywheel by a component of the transmission element, the axial size and the costs of the damping device are reduced.

The invention claimed is:

1. Transmission element for a traction chain of the parallel hybrid type, said element comprising:
    a movement input shaft intended to be connected to a thermal engine,
    a movement output shaft intended to be connected to a gear box,
    an electrical machine comprising a stator and a rotor, wherein the rotor is rotatably supported in the transmission element,
    an intermediate member which is rotatably supported in the transmission element independently from the rotor, and which is linked in rotation to the rotor,
    a first connecting clutch between the input shaft and the intermediate member, and
    a second connecting clutch between the intermediate member and the output shaft, and
    a casing comprising (i) a first half-shell supporting the input shaft movable in rotation, and (ii) a second half-shell supporting the output shaft movable in rotation, these two half-shells defining a housing in which are mounted, in a coaxial manner, the two clutches and the electrical machine,
    wherein the intermediate member and the rotor are engaged mutually through complementary axial teeth which are formed on the intermediate member and on the rotor, respectively.

2. Transmission element according to claim 1, wherein the two clutches are arranged radially inside the electrical machine.

3. Transmission element according to claim 1, wherein the first half-shell is integral with the stator and supports the rotor movable in rotation.

4. Transmission element according to claim 1, wherein the two clutches, the input and output shafts, and the intermediate member are part of a module that is arranged as one unit in the housing.

5. Transmission element according to claim 1, wherein the two clutches are of the wet type, the housing being closed so as to be sealed with respect to a lubrication and/or cooling fluid.

6. Transmission element according to claim 1, wherein the two clutches are returned toward the engaged position.

7. Transmission element according to claim 1, wherein the two clutches are disposed in a tiered manner, one being disposed radially on the outside with respect to the other.

8. Transmission element according to claim 7, wherein the first clutch is disposed radially on the outside with respect to the second clutch.

9. Transmission element according to claim 8, wherein the stator is disposed radially on the outside of the rotor, and the second clutch is disposed radially inside the rotor.

10. Transmission element according to claim 1, wherein at least one of the clutches is actuated by means of a control fluid via a single respective pressure member.

11. Transmission element according to claim 1, which comprises an axial fluid supply tube, in particular for hydraulic supply, integral with one of the half-shells and protruding toward the inside of the housing.

12. Motor vehicle comprising a traction chain of the parallel hybrid type, said traction chain comprising a thermal engine, a gear box, and the transmission element according to claim 1 connecting the thermal engine to the gear box.

13. Transmission element according to claim 1, wherein the first clutch is disposed axially in a downstream position with respect to the second clutch.

14. Transmission element according to claim 1, wherein the rotor is rotatably supported on the first half-shell and the intermediate element is rotatably supported on the second half-shell.

15. Transmission element according to claim 14, wherein the intermediate member is linked in rotation with the rotor via complementary teeth which are mutually engaged.

16. Transmission element according to claim 1, wherein pressure chambers for actuation of the first and second clutches are formed in the intermediate element.

17. Transmission element according to claim 1,
    wherein the stator is disposed radially on the outside of the rotor,
    and wherein the two clutches are disposed in a tiered manner,
    the second clutch being disposed radially inside the rotor, and the first clutch being disposed radially on the outside and axially in a downstream position with respect to the second clutch.

18. Method of assembling a transmission element according to claim 1, comprising the following successive steps:
    a first step of mounting a first subassembly comprising in an integral manner the first clutch, the second clutch, and the intermediate member, on a second subassembly comprising the second half-shell to form an assembly;
    a second step of mounting a third subassembly comprising in an integral manner the first half-shell and the electrical machine, on the assembly thus formed; and the second step includes linking the intermediate member on the rotor through mutual engagement of complementary axial teeth of the intermediate member and the rotor.

19. Method according to claim 18,
wherein the transmission element comprises an axial fluid supply tube, in particular for hydraulic supply, integral with one of the half-shells and protruding toward the inside of the housing, and
wherein the supply tube is mounted preliminarily on the second half-shell, so as to assemble the second subassembly comprising the second half-shell.

20. Method of assembling a transmission element according to claim 1, comprising the following successive steps:

a first step of mounting a first subassembly comprising in an integral manner the first clutch, the second clutch, and the intermediate member, on a second subassembly comprising in an integral manner the first half-shell and the electrical machine to form an assembly;
a second step of mounting the assembly thus formed on a third subassembly comprising the second half-shell; and
the first step includes linking the intermediate member on the rotor through mutual engagement of complementary axial teeth of the intermediate member and the rotor.

* * * * *